No. 746,697. PATENTED DEC. 15, 1903.
J. H. HALLBERG.
SYSTEM OF ELECTRICAL DISTRIBUTION.
APPLICATION FILED MAY 28, 1903.
NO MODEL. 2 SHEETS—SHEET 1.

WITNESSES:
J. E. Pearson

INVENTOR
J. H. Hallberg
BY
ATTORNEY

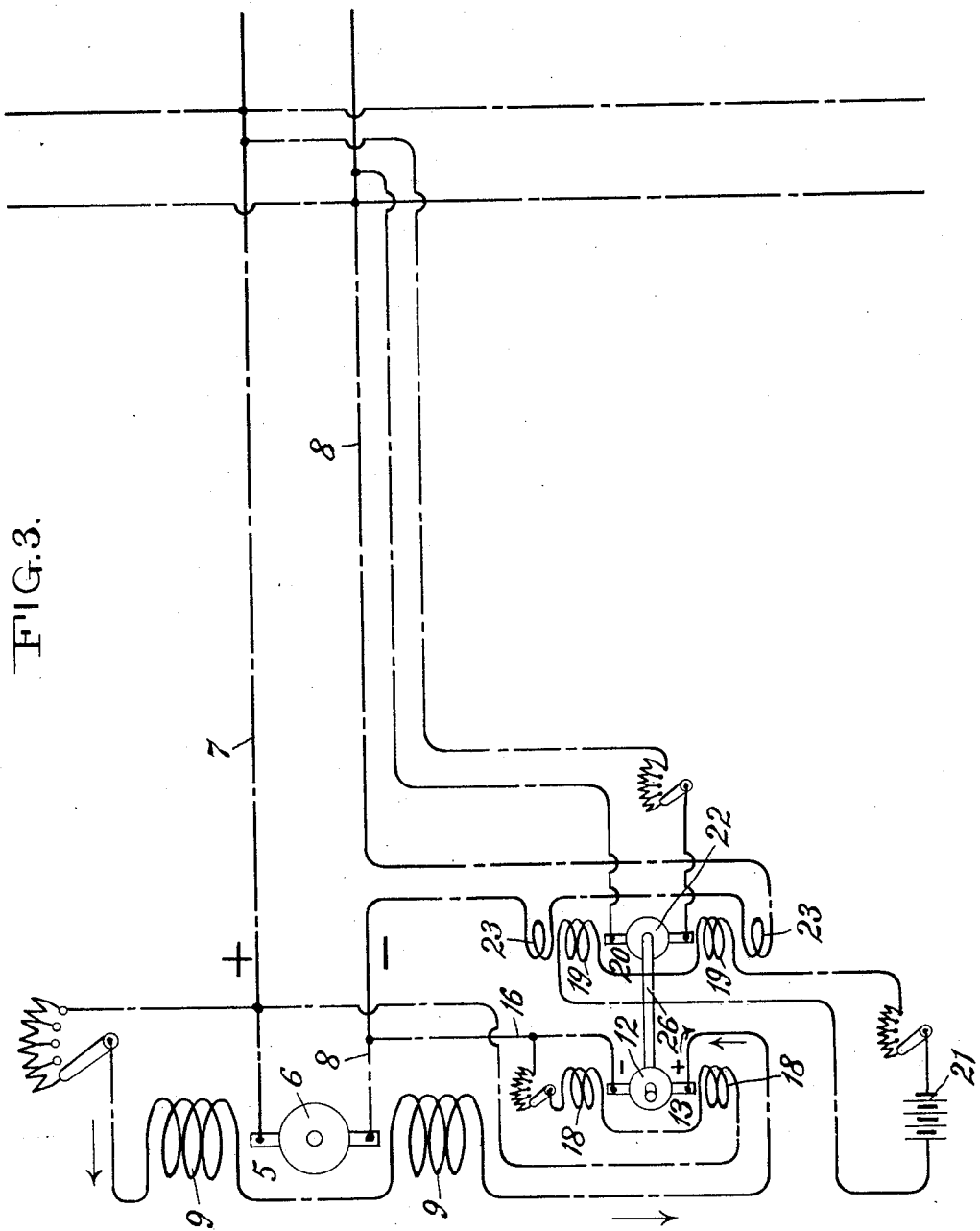

No. 746,697. Patented December 15, 1903.

UNITED STATES PATENT OFFICE.

JOSEF HENRIK HALLBERG, OF NEW YORK, N. Y.

SYSTEM OF ELECTRICAL DISTRIBUTION.

SPECIFICATION forming part of Letters Patent No. 746,697, dated December 15, 1903.

Application filed May 28, 1903. Serial No. 159,157. (No model.)

*To all whom it may concern:*

Be it known that I, JOSEF HENRIK HALLBERG, a citizen of the United States, residing at New York city, county and State of New York, have invented certain new and useful Improvements in Systems of Electrical Distribution, of which the following is a specification.

My invention has especial reference to the automatic regulation of the current-generating devices used in a system of electrical distribution.

My improved system may be employed for distributing heat, light, and power.

My invention depends upon the observed fact—*i. e.*, that the speed of a motor-armature where the field-magnets of the motor are excited from a source of constant potential may be increased or diminished within certain defined limits by varying the current traversing the armature of the motor.

Considered broadly my invention may be said to consist in a system of electrical distribution wherein the current traversing the field-magnets of the main generator or generators is automatically varied to maintain a uniform potential in the distributing-circuit by varying in accordance with the work in the distributing-circuit the speed of the armature of a motor driving a generator which delivers a current in opposition to the current exciting the fields of the main generator or generators of the system.

The object of the invention is to dispense with the use of compound windings on the field-magnets of the main generator or generators as also the employment of complicated rheostats or other regulating devices and generally to decrease the operating cost and increase the efficiency of the system.

The accompanying drawings will serve to illustrate my invention, in which—

Figure 1:
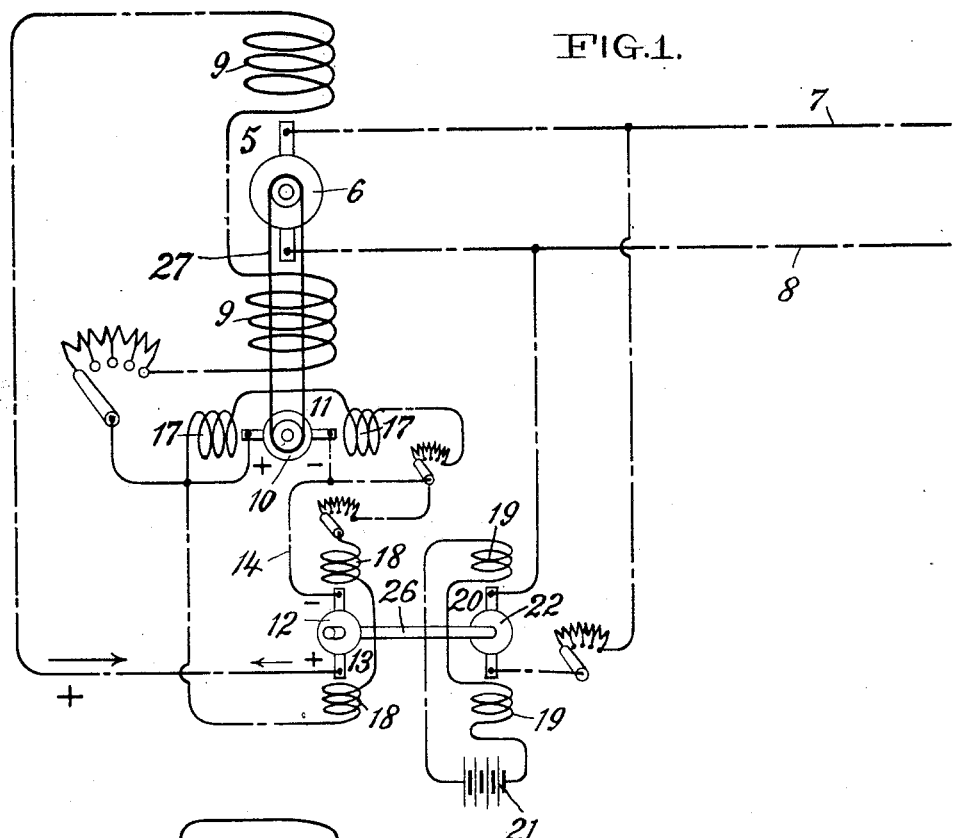
Figure 2:
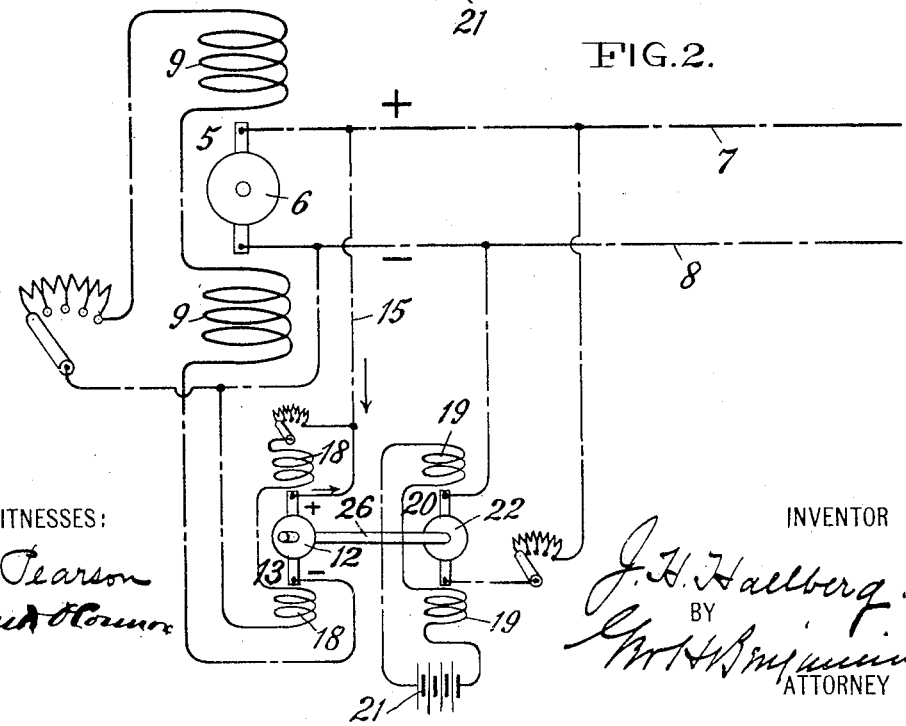

Figure 1 shows my improved system of electrical distribution, with a small dynamo for exciting the field-magnets of the main generator. Fig. 2 is a similar view with the field-magnets of the main generator connected across the distributing-circuit. Fig. 3 is a view corresponding to Fig. 2 with the motor-armature connected across the distributing-circuit at the "center of distribution," together with means for compounding the field-magnets of the motor.

In the diagrams, 5 indicates a main generator, in the present case a direct-current generator, which is shown as having its armature 6 connected across the outgoing and return conductors 7 8 of the distributing-circuit.

In Fig. 1 one terminal of the field-magnets 9 is connected to the plus (+) terminal of the armature 10 of a small generator 11, and the other terminal to the plus terminal of the armature 12 of a second small generator 13. The minus terminals of the generators 11 13 are connected to a conductor 14. In Fig. 2 one terminal of the field-magnets 9 is connected to the conductor 8 of the distributing-circuit and the other terminal to the minus terminal of the armature 12 of the small generator 13. Interposed between the plus terminal of the generator 13 and the conductor 7 of the distributing-circuit is a conductor 15. In Fig. 3 one terminal of the field-magnets 9 is connected to the conductor 7 of the distributing-circuit and the other terminal to the plus terminal of the armature 12 of the generator 13. A conductor 16 is interposed between the minus terminal of the armature 12 of the generator 13 and the conductor 8 of the distributing-circuit. In other words, in Fig. 1 the field-magnets are connected across the terminals of the armature 10 of the generator 11 and in Figs. 2 and 3 are connected across the distributing-conductors 7 and 8.

In Fig. 1 the field-magnets 17 of the generator 11 and the field-magnets 18 of the generator 13 are connected in parallel across the armature 10 of the generator 11. In Figs. 2 and 3 the field-magnets 18 of the generator 13 are connected across the distributing-conductors 7 8.

In Figs. 1, 2, and 3 the field-magnets 19 of the motor 20 are connected across a source of constant potential 21, which may be any suitable source of electric energy. In Figs. 1 and 2 the armature 22 of the motor is connected across the distributing-conductors 7 8. In Fig. 3 the armature of the motor is connected across the distributing-conductors at the center of distribution. In Fig. 3 the distributing-conductor 8 is carried downward and wound as a compound coil 23 upon each of the field-magnets 19 of the motor 20.

26 in all the figures represents a mechanical connection between the motor 20 and the generator 13, by means of which the generator 13 may be driven at the same speed as the motor 20. 27 indicates a similar connection between generators 5 and 11.

The operation of my device is as follows: A current derived from the generator 11 or in the case of the arrangement shown in Figs. 2 and 3 from the distributing-circuit opposed and cut down by the current from the generator 13 excites the field-magnets 9 of the generator 5. Assuming that with the motor driven at a given speed the excitation of the field-magnets 9 is sufficient to create the required potential in the distributing-circuit, it will be evident that if the speed of the motor is increased or decreased such potential will be correspondingly changed. Assuming the load thrown upon the distributing-circuit is in excess of that within the capacity of the generator 5 to maintain the required potential, then the speed of the armature 22 of the motor will decrease, which will correspondingly decrease the speed of rotation of the armature 12 of the generator 13, and thus cut down the current opposing the current fed to the field-magnets 9, with the result that more current will flow through the field-magnets 9 and the potential of the current in the distributing-circuit will be restored to the normal. Conversely as the load in the distributing-circuit is decreased the motor will speed up and increase the opposing current. It will thus be observed that the regulation is automatic.

In the arrangement shown in Fig. 3 the purpose of the compound coils 23 is to provide means for altering the excitation of the field-magnets 19 in proportion to the current flowing over the conductor 8. When a load is thrown upon the distributing-circuit, the current in conductor 8 will increase and correspondingly the current in the compound coils 23. The current flowing through the coils 23 follows the same direction as the current from the constant source of energy 21, flowing through the magnets 19, and hence serves to assist such current. The speed of the motor 20 and the opposing current from the generator 13 will, as explained in relation to Figs. 1 and 2, also be decreased, with the result that the excitation of the generator 5 will be increased to compensate for the increase in load. The motor 20 and the opposing current-generator 13 serve, as explained in relation to Figs. 1 and 2, to regulate the current in the distributing-circuit due to variations in load, while the compound coils are primarily designed to take care of variations of current in the conductor 8 between the generator 5 and the center of distribution, as affected by variations of load in the distributing-circuit.

I wish it understood that I do not limit myself to the precise arrangement of parts shown in the diagrams, provided that the arrangement is such that the current used to oppose the exciting-current is controlled by the variations in speed of the moving member of the motor.

Having thus described my invention, I claim—

1. Means for automatically regulating the electromotive force of a circuit supplied by a generator of variable electromotive force, comprising a motor having one member excited by the current from said circuit, a second member excited from a source of constant potential; and a generator driven by said motor and adapted to deliver a current in opposition to that normally exciting the field-magnets of the main generator.

2. A system of electrical distribution, comprising a main generator, a distributing-circuit, means for transmitting a current to the field-magnets of said generator, means for opposing a current to said transmitted current, and a motor device controlling said opposing current and controlled by variations of load at the center of distribution of the distributing-circuit.

3. A system of electrical distribution, comprising a generator, a distributing-circuit, means for transmitting a current to the field-magnets of said generator, a generator transmitting a current in opposition to said exciting-current, and a motor device actuating said generator of the opposing current, said motor device having its field-magnets connected to a source of constant potential and its armature connected across the distributing-circuit.

4. A system of electrical distribution, comprising a generator, a distributing-circuit, means for transmitting a current to the field-magnets of said generator, a generator transmitting a current in opposition to said exciting-current, a motor actuating said last-named generator, said motor having its field-magnets divided into two sets of coils, one set connected to a source of constant potential, and the other set in series in one of the distributing-conductors, and its armature connected across the distributing-conductors.

5. A system of electrical distribution comprising a generator, a distributing-circuit, means for transmitting a current to the field-magnets of said generator, means for generating a current in opposition to the exciting-current, a motor having its moving member connected to the generator for the opposing current, said motor having its field-magnets compounded, one portion of said field-magnets connected to a source of constant potential and the other portion excited by variations of current in one conductor of the distributing-circuit, and the armature of said motor connected across the distributing-circuit at the center of distribution in said circuit.

6. A system of electrical distribution, comprising a generator, a distributing-circuit, and means for varying the excitation of the field-magnets of the generator, in accordance with the load in the distributing-circuit, and the fall of potential between the generator and the center of distribution in said circuit.

7. A system of electrical distribution, comprising a generator, a distributing-circuit, means for transmitting a current to the field-magnets of said generator, means for generating a current in opposition to said transmitted current, a motor device having its armature connected across the distributing-circuit and its field-magnets divided into two parts, one part connected across a source of constant potential and the other part across the distributing-circuit, together with means for transmitting the motion of the motor to the generator of the opposing current.

8. In a system of electrical distribution wherein the excitation of the field-magnets of the generator is dependent upon the difference between two currents delivered in opposition, the means described for controlling one of said currents, said means consisting of a motor mechanically connected to the generator of one of said currents, and said motor having its field-magnets compounded, one portion excited from a source of constant potential and the other portion from a source of varying potential, and having its armature connected across the distribution-circuit.

9. A system of electrical distribution, comprising a generator, a distributing-circuit, a motor device having its armature connected across the center of distribution, and its field-magnets across a source of constant potential, means for transmitting a current to the field-magnets of said generator, and means for opposing a current to said transmitted current, said last-named means controlled by the speed of the motor.

In testimony whereof I affix my signature in the presence of two witnesses.

JOSEF HENRIK HALLBERG.

Witnesses:
J. E. PEARSON,
FRANK O'CONNOR.